United States Patent [19]

Gehen, Sr.

[11] Patent Number: 5,111,593

[45] Date of Patent: May 12, 1992

[54] TEMPLATE FOR POSITIONING OUTLET BOXES

[76] Inventor: Patrick K. Gehen, Sr., 63 S. Ogden St., Buffalo, N.Y. 14210

[21] Appl. No.: 716,102

[22] Filed: Jun. 17, 1991

[51] Int. Cl.⁵ .......................... B25B 11/00; B25B 3/00
[52] U.S. Cl. ................................. 33/613; 33/DIG. 10
[58] Field of Search ................. 33/DIG. 10, 528, 613; 269/904, 6

[56] References Cited

U.S. PATENT DOCUMENTS

| | | | |
|---|---|---|---|
| 2,962,281 | 11/1960 | Hodgson | 33/DIG. 10 |
| 2,990,172 | 6/1961 | Gianotta | 33/DIG. 10 |

Primary Examiner—Harry N. Haroian
Attorney, Agent, or Firm—James J. Ralabate

[57] ABSTRACT

The invention relates to a novel template for the uniform positioning of electrical boxes in walls of buildings. The template has a slidable vertical adjusting extension that can be locked in place when the appropriate height of installation is determined. The template also has depth adjusting screws which determine how deep on a stud the template will be nailed. On the front face of the template are handles and on the back face of the template is a clamp which holds the box securely in position while nailing to a stud.

6 Claims, 2 Drawing Sheets

TEMPLATE FOR POSITIONING OUTLET BOXES

This invention relates to a tool for positioning outlet boxes and, more particularly, to a novel template for uniformly locating electrical outlet boxes on a stud or the like.

BACKGROUND OF THE INVENTION

In the construction industry it is necessary to install electrical outlet boxes and switch boxes throughout the structure being built. In the construction of houses, office buildings, commercial structures or other type buildings, electrical outlet boxes are installed on a stud at uniform distances from the floor and in a uniform location in a fore and aft position. Once the switch box or outlet box is positioned at the desired location it is then nailed in place to the stud.

These outlet or switch boxes to be properly mounted are generally held in place with one hand and nailed with the other hand. It has been found that trying to hold the box in place while nailing is imprecise and frequently causes variations in fixed locations of the boxes. Precisely fixing the box at the proper height, depth and location has been difficult because of the several location concerns involved. Frequently, it could require the assistance of two people, one to hold the box in the exact location and the other to nail it in place. Installation of electrical boxes has been a time-consuming and relatively imprecise procedure.

There have been several attempts to solve this problem. For example, various templates or tools have been devised to hold the box in position while securing it to a stud or other support. Generally, these tools have proven to be an improvement over a two-man operation but also lacking in one respect or another. Frequently, the tools devised have been awkward to use or have required complex adjustments or manipulations to properly function.

Typical devices used in attaching outlet boxes to a stud have been disclosed in U.S. Pat. Nos. 3,954,717 (Tarr); 4,706,359 (Greenhill); 4,750,271 (Ericksen) and 4,850,115 (Price). Each of these devices represents an improvement over handholding the box in place and having an assistant nail it to the stud.

In the Tarr patent a mount is provided in the tool that is positionable against the outer face thereof and a support is vertically adjustable to position the box at the proper height. The tool is held against the face of the stud, the box is then placed into the tool, then while still holding the box in the correct position, it is attached to the stud. With the Tarr tool it is required to hold the tool against the stud and while holding the tool place the box in the tool. This requires using both hands, one to hold the box in place and one to hold the tool in place. The tool of Tarr does not have handles which could make his tool difficult to properly use. It appears that in Tarr's invention the box is adjusted in position by moving the slidable support up or down. It would be desirable to fix the box in position and move the tool height up or down.

In U.S. Pat. No. 4,706,359 (Greenhill) a device that fits between the studs is disclosed. Greenhill's tool is self supporting and can be placed between the studs at a desired height and depth. When the tool is manually released it engages the studs. With the Greenhill device one is required to measure the height of every individual box to be installed. Generally, one using the Greenhill tool would first have to use a tape to measure up a stud, mark the location each time and subsequently place the device in position. Again, it would be a desirable feature to have a tool with means to fix a support at a predetermined location so that each individual box location need not be separately measured.

Ericksen, U.S. Pat. No. 4,750,271, discloses a template for use in locating an electrical box on a stud. The template releasably supports the electrical box at a preselected height and position forwardly of the face of the vertical stud. The Ericksen device does not have a handle and would seem to be difficult to hold in place. Ericksen's device appears to have only one setting for the forwardly position off the stud; it would be desirable to have a multiple setting in this regard. Also, Ericksen's box support slides vertically on an extended sleeve or tube thereby moving the box and support with each box installation.

In U.S. Pat. No. 4,850,115 to Price a tool for locating an installation location for an electrical outlet box is disclosed. The Price device is an elongated structure of about five feet long which could be impractical for certain operations. Price uses an elongated extended support member having a rectangular or square cross section. The rear surface is a plate for placement against the front surface of a stud on which electrical outlet boxes are to be placed. The front surface has a slot in it and box locater devices are slidably attached in the slot so that the vertical height of electrical boxes is established. The Price device has no handles and could be awkward in some installation operations. Holding a five-foot support tightly against the stud and attempting to nail the box could be a difficult operation.

Therefore, it would be a significant advance of the art if a tool for positioning an outlet box was provided with handles, vertical adjusting means, depth adjusting means and a clamping means to securely hold the box in position.

SUMMARY OF THE INVENTION

It is therefore an object of this invention to provide a tool for positioning electrical outlet boxes in position that is devoid of the above-noted disadvantages.

Another object of this invention is to provide a tool for positioning electrical outlet boxes wherein one hand is always free to nail the box to a support.

Yet another object of this invention is to provide a tool that securely holds each box in position at a preselected fixed location.

Still another object of this invention is to provide a device that has handles and can easily be held in position when used.

Still yet another object of this invention is to provide an outlet box installing device having novel adjusting means that can be fixed in place for multiple use.

Yet still another object of this invention is to provide a tool that can easily hold the box in place while freeing the user's other hand for nailing the box in place.

Another still further object of this invention is to provide a tool that is easy to use, small enough for most operations and easily transported from one location to the other.

These and other objects of this invention are accomplished generally speaking by providing a box-installing tool having measuring means for both height and depth positioning of the electrical box. It is critical to this invention that a clamping means (or equivalent) is used to securely hold the box in position prior to nailing to a stud. Also important to this invention is a handle means to facilitate holding the tool against the stud just prior to nailing. A novel depth adjusting means is located on each corner of the tool of this invention to provide easy means to fix the depth location of the box on the stud. For example, the setting can be fixed for holding an electrical box ½ inch out from the stud because electrical boxes have to be flush with drywall which is normally also ½ inch thick. After the drywall is installed the box outer face will be flush with the drywall. Thus, the tool of the present invention provides a means to save time and make easier the installation of electrical boxes. The tool provides means to install a plurality of electrical boxes at the same height and depth uniformly throughout the house or building. This is accomplished without the need to adjust the tool for each box to be installed. Also, because of the box support clamp, the box is automatically held in place by the tool leaving the other hand free to nail the box to the support stud.

The tool of this invention can be made of wood, plastic, fiberglass or any other suitable material. In the front of this measuring tool at the upper portion thereof is located a handle means for holding the tool in place. Also, on the front face of the tool at the bottom portion is a slidable vertical adjusting means which sets the desired height at which the box is to be mounted. This sliding ruler is calibrated in inches (or other convenient increments) and has a locking means which fixes the ruler at a uniform desired height. This in turn fixes the box which is mounted in the tool and all subsequent boxes at a predetermined height. One convenient locking means that is used in the present invention is a wing nut which can easily be loosened or tightened when desired. At each corner of the tool are located depth adjusting means which determine how far beyond the stud the box will be fixed in place. These depth adjusting means can be, for example, four (one at each corner) 8/32 screws which are spring loaded on the tool. The screws are turned until the desired distance is accomplished and then the springs will fix them at the location of the last turn. These screws easily set the desired distance off of the forwardly face of a stud.

In the back face of the tool of this invention is a spring loaded clamp which together with a lower support holds the box in the desired position on the tool. While the spring loaded clamp extends in contact with the top of the box, it could just as easily be located to contact the bottom of the box if desired for any reason.

In using the tool of this invention the four 8/32 screws at each corner can be set to the desired forwardly position for location off the stud. These screws are under spring tension so that they can be fixed in position and also will not rattle loose. Next, the sliding ruler is set to the desired height at which the boxes are to be mounted. The outlet box is then loaded on the back face of the tool positioned between the spring loaded clamp and a support projection that supports the bottom of the box. The downward pressure of the clamp presses the box against the bottom support and holds the box firmly in position. Then, while holding the handles with one hand, the box bearing tool is pressed against the stud firmly so that the 8/32 screws are tight against the stud. When this is accomplished with one's free hand, it is possible to nail or otherwise secure the outlet box onto the stud. This is accomplished at a predetermined height and depth off the stud. The next box to be installed is merely loaded onto the tool without the necessity of adjusting the height or depth since these were fixed in place when the first box was installed. It is only required to adjust the tool to the desired height and depth once as the first box is installed. This single adjustment step provides an easy and expedient process of installing a plurality of boxes uniformly throughout the house.

DESCRIPTION OF THE DRAWING AND PREFERRED EMBODIMENT

Figures 1, 2:
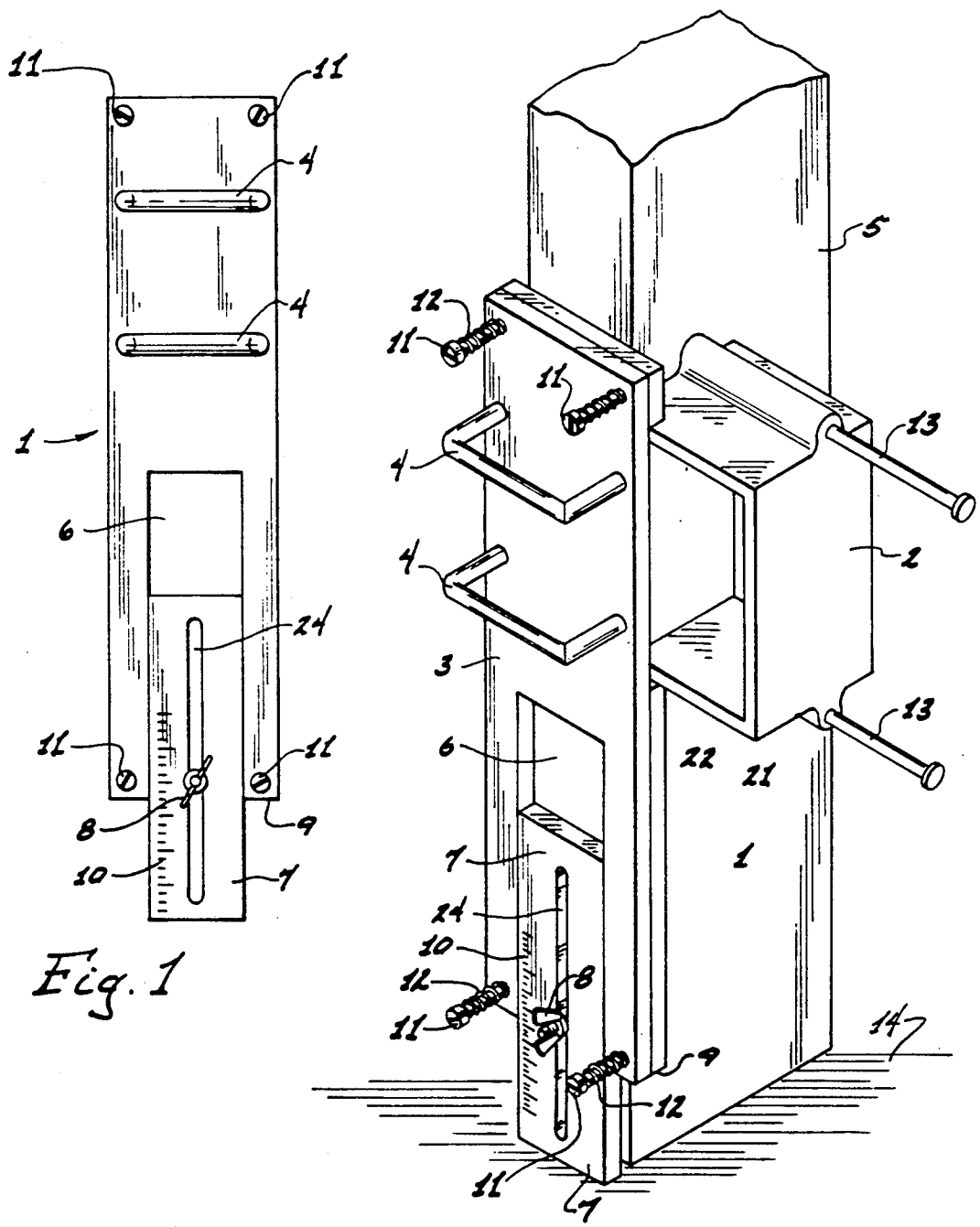
FIG. 1 is a front plan view of the template or tool of this invention.
FIG. 2 is a front plan view of the template of this invention when it is pushed up against a stud or other supporting structure.

The measuring tool or template 1 for positioning outlet boxes 2 (see FIGS. 2, 3, and 4) to studs is shown from its front face. The template 1 comprises a main panel or structure 3 having a general rectangular configuration. At the top portion of main structure 3 are located handle means 4 to be used to position and hold template 1 against a stud 5 (see FIGS. 2, 3 and 4). One hand is used to hold the handles 4 while the free hand of the user can be used to nail the box 2 to the stud 5. One or a plurality of handles 4 may be used if desired. At the bottom portion of main structure 3 is a cut out or an opening 6 in which a sliding rule or vertical adjusting means 7 moves. A wing nut 8 is merely loosened and sliding rule 7 is moved upward or downward along opening 6 and channel 24 until the desired vertical position is reached, then wing nut 8 which is located in rule channel 24 is tightened to fix that position in place. For example, if a six-inch extension of sliding rule 7 beyond the lower end 9 of main structure 3 is desired, the slide rule is moved to the six-inch mark on calibrations 10 and wing nut 8 tightened. Now all boxes 2 will be installed at the same height on the stud 5 since the six-inch adjustment is locked in place. At each of the corners of main structure 3 are located depth adjusting means or spring loaded screws 11 which determine the distance from or depth at which the outlet boxes 2 are installed on the stud 5. Each box 2 must be fixed upon stud 5 so as to permit plasterboard or drywall to be placed flush with the box 2. The spring-loaded screws 11 are turned until the desired distance from the stud is reached, then by releasing the turning action of screw 11, it will be locked in place by the outward force of the spring 12 (in FIG. 2).

In FIG. 2 the template 1 is shown with a box 2 loaded thereon. Nails or box connection means 13 extend out from box 2 and are merely nailed into stud 5 when box 2 is in place. Handle means 4 are held with one hand and the other hand used to pound nails 13 into the stud 5. Vertical adjusting means 7 is fixed in place by wing nut 8 making the height of the box 2 uniform in all box installations. Floor 14 is contacted by the lowest part of adjusting means 7 when the adjustment is made locking adjusting means 7 in place. The springs 12 are shown in perspective around screws 11 for clarity; after screws 11 are turned to the desired distance, they are released and springs 12 will hold them firmly in place. Slot or opening 6 into which vertical adjusting means 7 fits and moves is shown after adjusting means 7 is moved and fixed downwardly.

Figure 3:
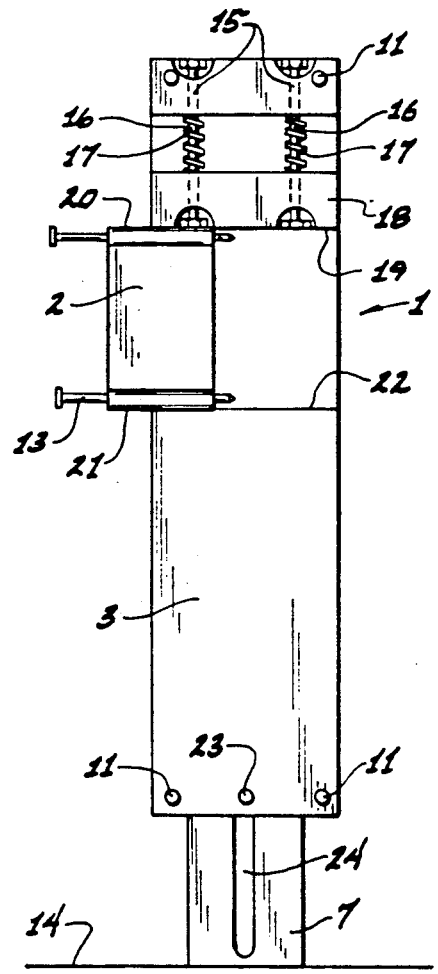
FIG. 3 is a back plan view of the template or tool of this invention after the outlet box is loaded thereon.

In FIG. 3 the back face of template 1 is shown with an outlet box 2 loaded therein. Depth adjusting means or spring-loaded screws 11 are shown in each corner of main panel or structure 3. Spring clamping means 15 comprise rods or bolts 16 having springs 17 wound around them. Lower clamp 18 will move up or down having its lower face 19 pressure contacting the upper surface 20 of box 2. The bottom surface 21 of box 2 abuts against a projection or strip 22 which supports the box 2 and together with clamp piece 18 holds box 2 firmly in position for nailing to a stud 5. The clamping means 15 can be reversed having the pressure piece 19 at the bottom and support strip 22 at the top, if desired. Nails 13 are shown before they are pounded into studs 5. While the configuration of template 1 is shown throughout this disclosure as rectangular, it can be made of any configuration desirable. The back head 23 of wing nut bolt is shown as it extends through the thickness of panel 3.

Figure 4:
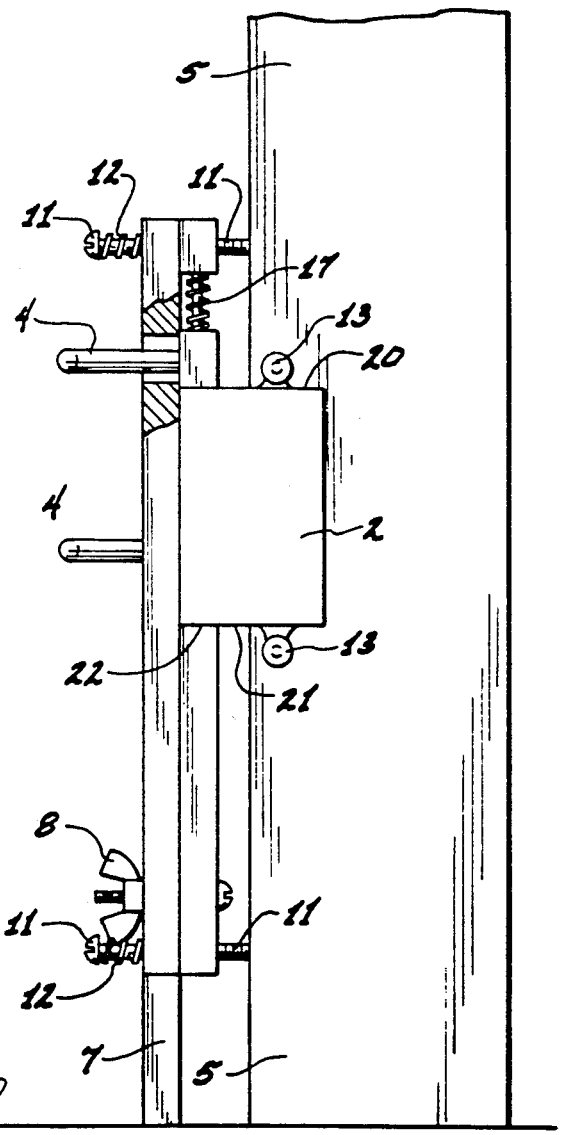
FIG. 4 is a side plan view of the template or tool of this invention when it is pushed up against a stud prior to nailing the outlet box to the stud.

In FIG. 4 the template 1 is shown as it is placed against stud 5 prior to nailing. As shown, one hand of the user holds the handle 4 while the other hand is free to pound nails 13 of box 2 into stud 5. The box 2 is held firmly in place by clamping means 15 as shown in FIG. 3. It is critical to the present invention to have on one face of template 1 handles 4 and on the opposite back face of template 1, clamping means 15 to hold the box 2 firmly in position. Unlike prior art devices this arrangement permits one (rather than two people) to easily install the boxes 2. The corner depth adjusting means 11 are also very important as is the slide rule 7 to the easy use of the template 1 of this invention. At least one corner depth adjusting means 11 must be used and preferably four are used.

The box 2 is nailed onto stud 5 leaving a front space or distance for plasterboard to be installed thereby making the outer face of box 2 flush with the outer face of the plasterboard.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A template for installing electrical outlet boxes which comprises in combination a main panel having on its front face handle means and on an opposite back face a clamping means, said clamping means adapted to firmly hold an electrical outlet box in position, movably located on a lower section of said main panel is a vertical adjusting means which is adapted to measure and determine the vertical location of the box as it is mounted onto main panel via said clamping means and wherein said main panel has depth determining means located on all four corners of said main panel.

2. The template of claim 1 wherein, said depth adjusting means comprising spring loaded screws.

3. The template of claim 1 wherein said vertical adjusting means comprises a calibrated slide rule that can move beyond the lower surface of said main panel, said vertical adjusting means having locking means associated therewith for locking it in position.

4. The template of claim 1 wherein, said box clamping means comprising a support strip and above it a movable means under pressure which is capable of exerting a holding pressure upon the upper or lower face of an electrical outlet box when said box is placed between said movable means and said support strip.

5. The template of claim 1 wherein the bottom terminal end of said vertical adjusting means is adapted to rest on a floor or other support to determine the height base for said template.

6. A template for installing electrical outlet boxes on a stud or the like, said template comprising in combination a main panel piece having a front face and an opposite back face, said front face comprising handle means and vertical adjusting means, said vertical adjusting means being movable downwardly of said main panel, said vertical adjusting means is adapted to measure and determine the vertical location of said boxes as they are mounted onto main panel via a clamping means, said vertical adjusting means comprising a slide rule having a channel extending for at least a portion of its length, and wherein said main panel has depth determining means located on both its upper and its lower terminal portions.

* * * * *